United States Patent
Watanabe (10) Patent No.: US 7,240,121 B2
(45) Date of Patent: Jul. 3, 2007

(54) CONTENT PROVIDING APPARATUS AND CONTENT PROVIDING METHOD

(75) Inventor: Koichiro Watanabe, Saitama (JP)

(73) Assignee: Sony Corporation (JP)

(*) Notice: Subject to any disclaimer, the term of this patent is extended or adjusted under 35 U.S.C. 154(b) by 622 days.

(21) Appl. No.: 10/398,580

(22) PCT Filed: Jul. 26, 2002

(86) PCT No.: PCT/JP02/07587

§ 371 (c)(1),
(2), (4) Date: Oct. 20, 2003

(87) PCT Pub. No.: WO03/017668

PCT Pub. Date: Feb. 27, 2003

(65) Prior Publication Data

US 2004/0052371 A1    Mar. 18, 2004

(30) Foreign Application Priority Data

Aug. 15, 2001  (JP)  ............................. 2001-246345

(51) Int. Cl.
*G06F 15/16* (2006.01)

(52) U.S. Cl. ............... 709/231; 709/203; 709/217; 709/226; 709/232; 370/235; 370/395.1; 370/470; 370/473; 370/477; 725/98; 725/118; 725/148

(58) Field of Classification Search ............... 709/203, 709/231, 232, 236, 217, 226; 370/235, 395.1, 370/470, 473, 477; 725/98, 118, 148
See application file for complete search history.

(56) References Cited

U.S. PATENT DOCUMENTS

| | | | | |
|---|---|---|---|---|
| 5,345,316 A | * | 9/1994 | Ozaki et al. | 382/234 |
| 5,526,349 A | * | 6/1996 | Diaz et al. | 370/392 |
| 5,638,411 A | * | 6/1997 | Oikawa | 375/372 |
| 5,774,498 A | * | 6/1998 | Oya et al. | 375/257 |
| 5,790,539 A | * | 8/1998 | Chao et al. | 370/390 |
| 5,930,473 A | * | 7/1999 | Teng et al. | 709/204 |
| 6,031,818 A | * | 2/2000 | Lo et al. | 370/216 |
| 6,282,209 B1 | * | 8/2001 | Kataoka et al. | 370/498 |
| 6,288,739 B1 | * | 9/2001 | Hales et al. | 348/14.07 |
| 6,289,381 B1 | * | 9/2001 | Brodigan | 709/225 |

(Continued)

FOREIGN PATENT DOCUMENTS

JP    2000-125260 A1    4/2000

(Continued)

OTHER PUBLICATIONS

International Search Report of PCT/JP02/07587 dated Oct. 29, 2002.

*Primary Examiner*—Michael Y. Won
(74) *Attorney, Agent, or Firm*—Rader Fishman & Grauer PLLC; Ronald P. Kananen (57) ABSTRACT

The present invention is applied to the distribution of music and videos via the Internet. Single stream content is divided into a plurality of parts A to D in a time-series manner, and a first part A is transmitted via stream distribution, and remaining parts B to D are transmitted via buffering distribution such that decoding of a receiver's side can be started upon the end of decoding an immediately preceding part.

12 Claims, 5 Drawing Sheets

U.S. PATENT DOCUMENTS

| | | | |
|---|---|---|---|
| 6,377,972 B1* | 4/2002 | Guo et al. | 709/201 |
| 6,449,653 B2* | 9/2002 | Klemets et al. | 709/231 |
| 6,678,736 B1* | 1/2004 | Malmkvist et al. | 709/231 |
| 6,795,863 B1* | 9/2004 | Doty, Jr. | 709/231 |
| 6,823,394 B2* | 11/2004 | Waldvogel et al. | 709/231 |
| 6,834,110 B1* | 12/2004 | Marconcini et al. | 380/239 |
| 6,925,263 B2* | 8/2005 | Horne | 398/154 |
| 6,925,501 B2* | 8/2005 | Wang et al. | 709/231 |
| 6,973,081 B1* | 12/2005 | Patel | 370/390 |
| 6,986,158 B1* | 1/2006 | Terui et al. | 725/116 |
| 7,003,794 B2* | 2/2006 | Arye | 725/100 |
| 7,006,497 B2* | 2/2006 | Dove et al. | 370/390 |
| 7,047,308 B2* | 5/2006 | Deshpande | 709/232 |
| 2001/0047260 A1* | 11/2001 | Walker et al. | 704/260 |
| 2002/0023165 A1* | 2/2002 | Lahr | 709/231 |
| 2002/0107969 A1* | 8/2002 | Waldvogel et al. | 709/231 |
| 2002/0124262 A1* | 9/2002 | Basso et al. | 725/109 |
| 2002/0141596 A1* | 10/2002 | Hara | 381/22 |
| 2002/0143951 A1* | 10/2002 | Khan et al. | 709/227 |

FOREIGN PATENT DOCUMENTS

| | | |
|---|---|---|
| JP | 2001-16567 A1 | 1/2001 |
| JP | 2001-57570 A1 | 2/2001 |
| JP | 2001-202330 A1 | 7/2001 |
| JP | 2002-94560 A1 | 3/2002 |

* cited by examiner

CONTENT PROVIDING APPARATUS AND CONTENT PROVIDING METHOD

BACKGROUND OF THE INVENTION

1. Technical Field

The present invention relates to a content providing apparatus and a content providing method that can be applied, for example, to the distribution of music and videos via the Internet. In the present invention, single stream content is divided into a plurality of parts in a time-series manner, and a first part is transmitted via stream distribution, whereas remaining parts are transmitted via buffering distribution such that decoding of a receiver's side can be started upon the end of decoding an immediately preceding part, whereby the stream content is distributed with a high reliability and latency can be reduced remarkably as compared to that in the conventional art.

2. Background Art

Conventionally, to distribute information such as music, films, etc. whose content changes with time (hereinafter called stream content), it is designed to use a method of providing stream content while its data is being received (hereinafter called stream distribution) and a method of providing a user with stream content after its data is temporarily buffered (hereinafter called buffering distribution).

Figure 1:
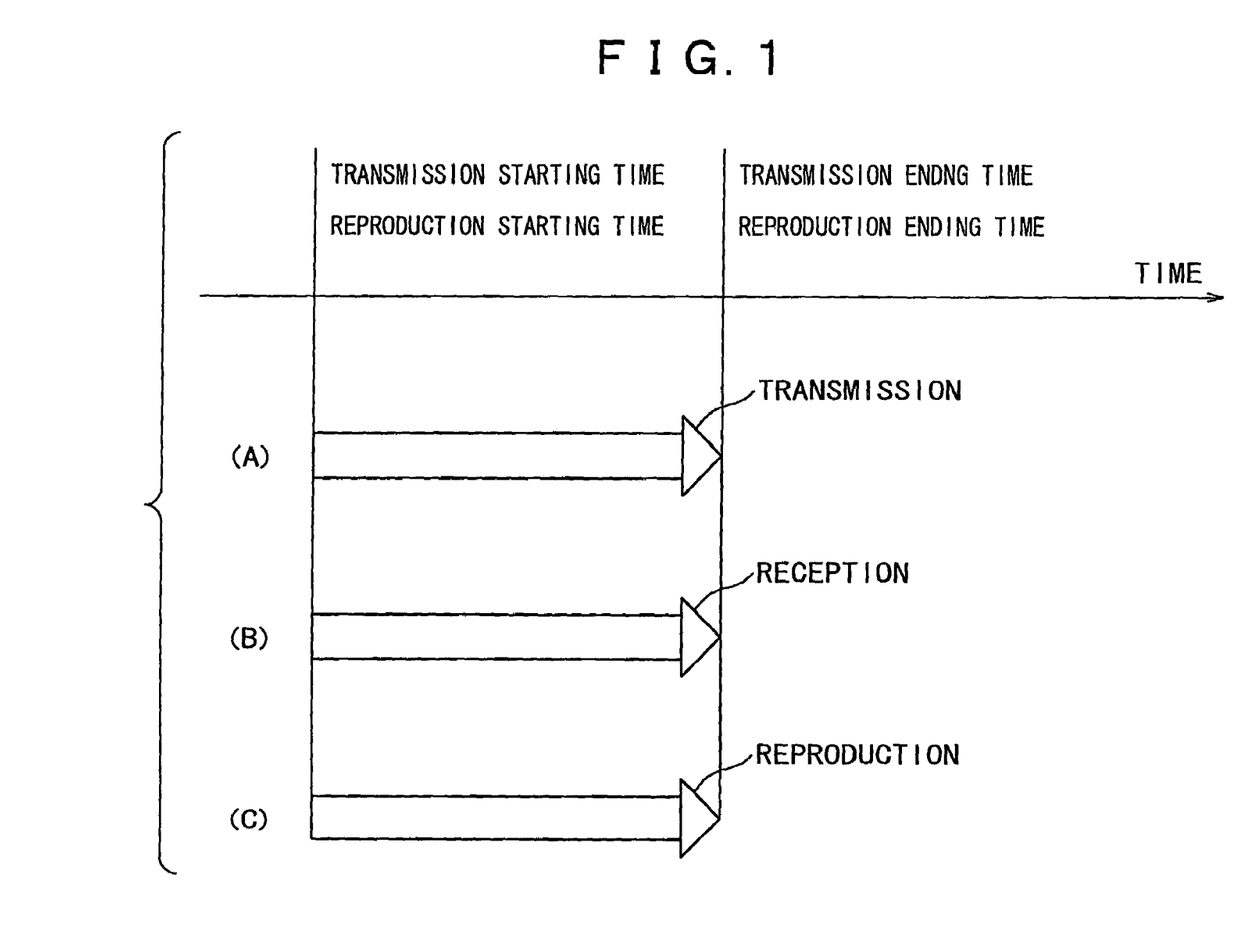
FIG. 1 is a characteristic curve diagram for explaining conventional stream distribution.

That is, in the stream distribution, as shown in FIG. 1, a transmitter's side transmits stream content to a client at a transfer rate that is substantially the same as a reproduction speed (FIG. 1 (A)), and a receiver's side buffers the received data in an amount large enough to decode the stream content (FIG. 1 (B)) for sequential decoding (this process on the receiver's side is called stream reception as corresponding to the stream distribution). In the case of this method, the stream content transmitted by the transmitter can be reproduced only to a very small delay time required for data transmission and decoding (FIG. 1 (C)), whereby the latency between the start of receiving the stream content and the start of actually reproducing it can be reduced, thereby allowing the stream content to be provided smoothly.

Figure 2:
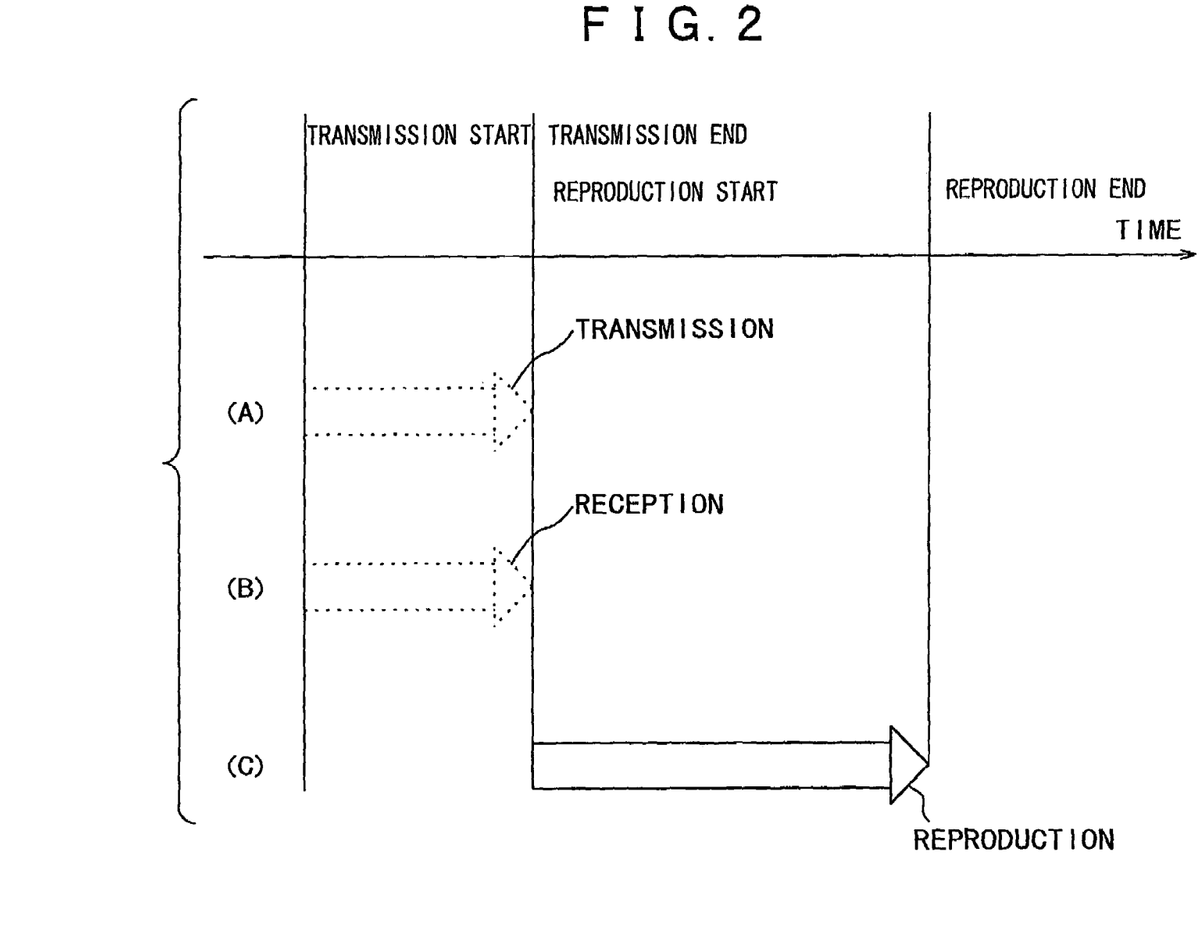
FIG. 2 is a characteristic curve diagram for explaining conventional buffering distribution.

By contrast, in the buffering distribution, as shown in FIG. 2, a transmitter's side transmits stream content at a rate irrelevant to the reproduction speed (FIG. 2 (A)). A recipient receives the stream content, buffers all the received stream content (FIG. 2 (B)), and thereafter decodes the buffered stream content to provide a user with the decoded stream content (FIG. 2 (C)) (this process on the receiver's side is hereinafter called buffering reception as corresponding to the buffering distribution). In the case of this method, there is a shortcoming that a relatively long time interval is required between the start of receiving the content and the start of actually reproducing it. However, in the case of this method, all the stream content is received and buffered in advance prior to its reproduction, and this allows an error recovery technique, such as error correction or retransmission request processing in TCP/IP, to be applied, whereby the stream content can be distributed with a correspondingly higher reliability.

In the buffering distribution, it is so designed that single stream content is decomposed into a plurality of parts to be transmitted sequentially, thereby reducing the latency between the start of receiving the stream content and the start of actually reproducing it.

Figure 3:
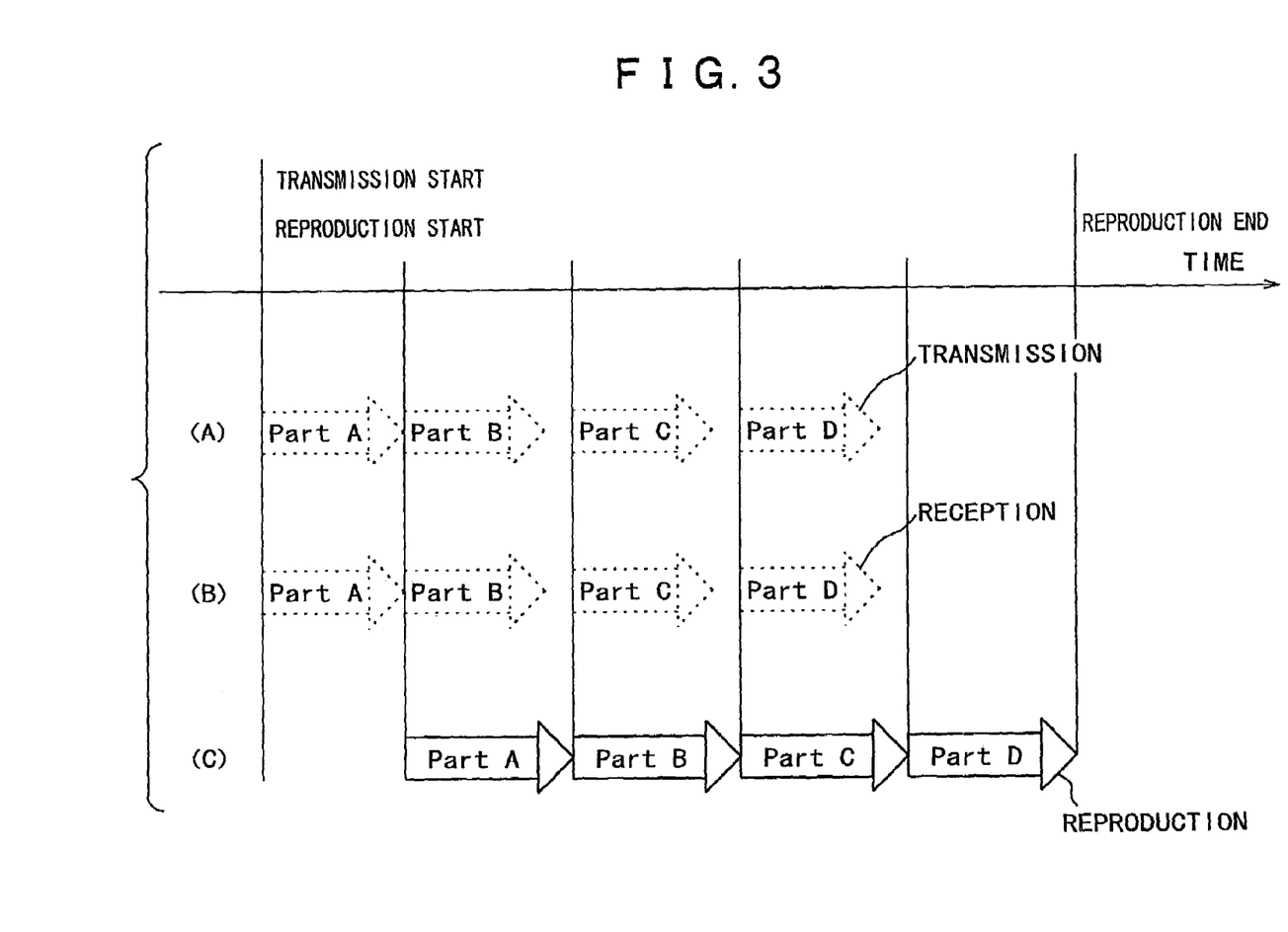
FIG. 3 is a characteristic curve diagram for explaining buffering distribution in which single stream content is divided into a plurality of parts.

That is, in the case of this method, as shown in FIG. 3, a transmitter's side divides single stream content into, for example, four parts A to D in a time-series manner, and transmits these parts A to D sequentially (FIG. 3 (A)). In response thereto, a receiver's side receives and buffers these parts A to D, and, upon completion of receiving one part, starts reproducing this part. Thus, it is so designed that after having buffered the first part A, the receiver's side starts decoding a part whose reception is completed while buffering another part, thereby reducing the latency (FIGS. 3 (B) and (C)).

Thus, the buffering distribution has merit in that stream content can be distributed with a high reliability, but it does involve the problem of generating latency. For this reason, a user who has requested stream content cannot listen to a demonstration of the content during the latency period. Incidentally, as explained with reference to FIG. 3, even when single stream content is divided and distributed as a plurality of parts, the latency does exist before reception of the first part is completed.

DISCLOSURE OF THE INVENTION

The present invention has been made in consideration of the above points and attempts to propose a content providing apparatus and a content providing method by which stream content is distributed with a high reliability and latency can be reduced remarkably as compared to that in the conventional art.

In order to solve the above problem, the present invention is applied to a content providing apparatus for transmitting predetermined stream content to a client. Among a plurality of parts formed by time-series division of single stream content, a first part is transmitted via stream distribution, and remaining parts are transmitted via buffering distribution such that decoding of a receiver's side can be started upon the end of decoding an immediately preceding part.

The stream distribution exhibits an extremely low latency but has a demerit of low reliability, whereas the buffering distribution exhibits a high latency but has a merit of high reliability. Thus, according to the configuration of the present invention, the first part is transmitted via the stream distribution, and the remaining parts are transmitted via the buffering distribution such that decoding of the receiver's side can be started upon the end of decoding an immediately preceding part, whereby while reproducing the first part after an extremely low latency, buffering of the succeeding parts can be completed, and thereby allowing the parts subsequent to the first part to be reproduced without interruption. Thus, stream content can be provided, ensuring a high reliability.

Further, the present invention is applied to a content providing apparatus for receiving stream content transmitted by a predetermined server to provide a user with the received stream content. The stream content is divided into a plurality of parts in a time-series manner to be transmitted by the server, and the content providing apparatus receives a first one of the parts via stream reception to be provided to the user and buffer-receives the rest of the parts in a manner decodable upon completion of decoding an immediately preceding part.

Thus, according to the configuration of the present invention, the process performed by the receiver's side permits the stream content to be provided at a low latency and ensures high reliability.

Still further, the present invention is applied to a content providing method of transmitting predetermined stream content to a client. Among a plurality of parts formed by time-series division of single stream content, a first part is transmitted via the stream distribution, and remaining parts are transmitted via the buffering distribution such that decoding of a receiver's side can be started upon the end of decoding an immediately preceding part.

According to the configuration of the present invention, a content providing method can be provided by which stream content is distributed with a high reliability and latency can be reduced remarkably as compared to that in the conventional art.

Still further, the present invention provides a content providing method of receiving stream content transmitted by a predetermined server to provide a user with the received stream content. The stream content is divided into a plurality of parts in a time-series manner to be transmitted by the server, and the content providing method includes receiving a first one of the parts via stream reception to be provided to the user and buffer-receiving the rest of the parts in a manner decodable upon completion of an immediately preceding part.

According to the configuration of the present invention, a content providing method can be provided by which stream content is distributed with a high reliability and latency can be reduced remarkably as compared to that in the conventional art.

BEST MODES FOR CARRYING OUT THE INVENTION

Embodiments of the present invention are described below in detail with reference to the drawings whenever appropriate.

(1) Configuration of an Embodiment

Figure 4:
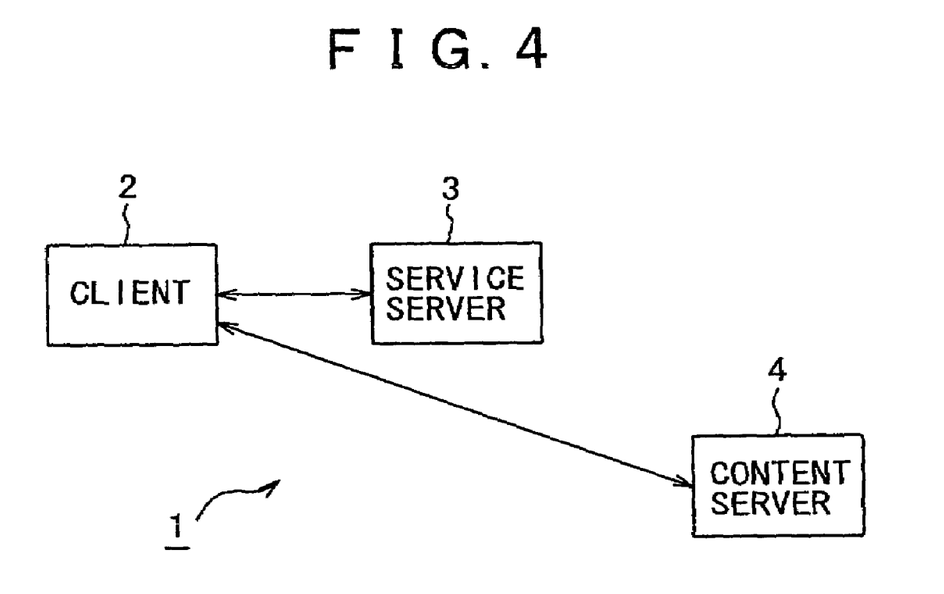
FIG. 4 is a block diagram showing a distribution system according to an embodiment of the present invention.

FIG. 4 is a block diagram showing a distribution system according to an embodiment of the present invention. In this distribution system 1, a client 2 is a computer connected to a network, such as the Internet, and is a receiving unit of content. A service server 3 functions as an HTTP server and renders services, such as presentation of providable content by access from the client 2. A content server 4 provides stream content by similar access from the client 2.

Here, the content server 4 divides single stream content for distribution into a plurality of parts in a time-series direction and distributes a first part via stream distribution and the remaining parts via buffering distribution such that a receiver's side can perform reproduction upon completion of reproducing an immediately preceding part, i.e., the receiver's side can complete buffering upon completion of decoding an immediately preceding part.

Figure 5:
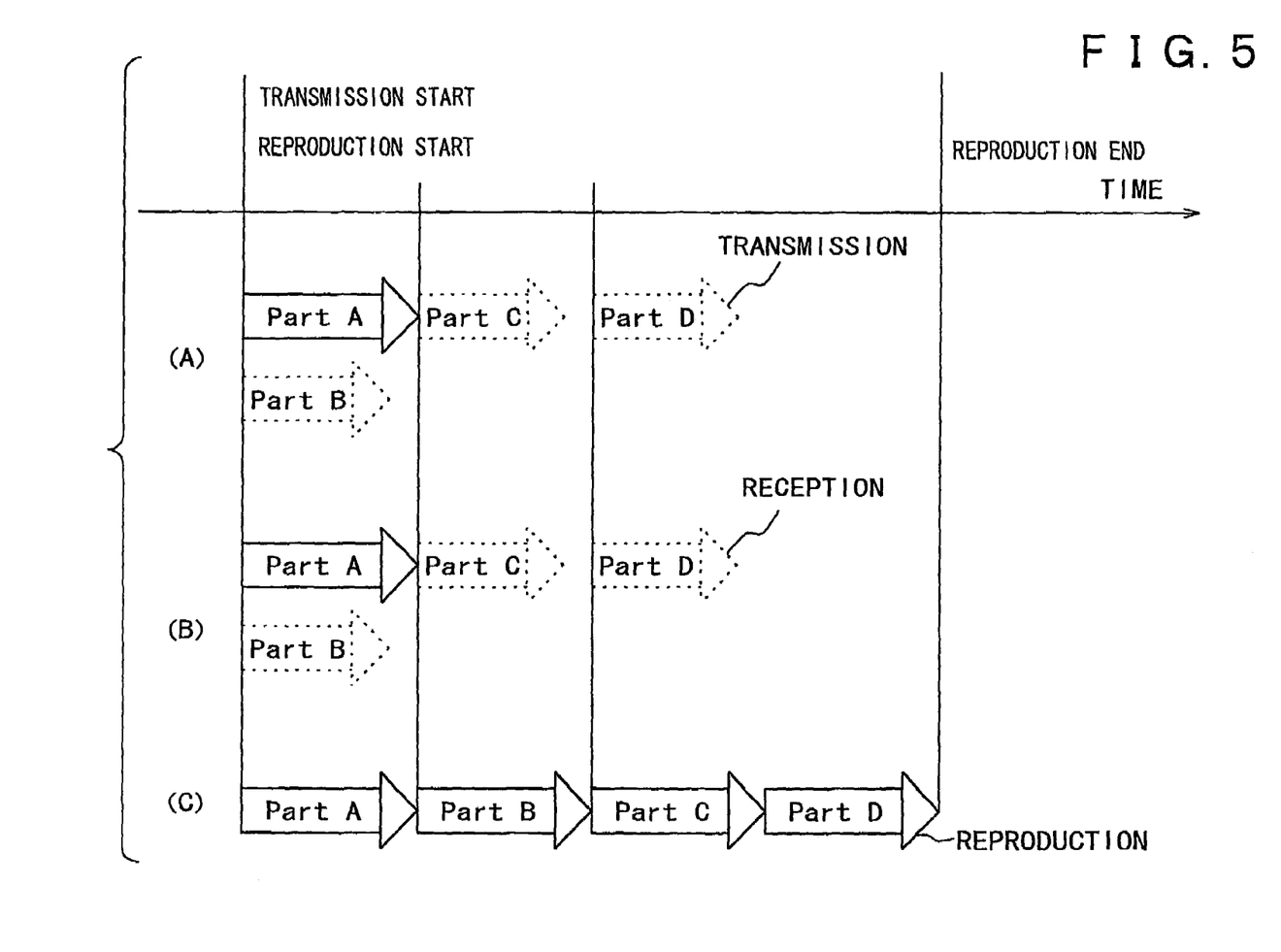
FIG. 5 is a characteristic curve diagram for explaining the distribution of stream content in FIG. 4.

That is, in this embodiment, as shown in FIG. 5, single stream content is arranged in a time-series manner and divided into four parts A to D. Here, the parts A to D are formed such that they are related to each other to have their reproduction time doubled sequentially in the time-series direction. Among these parts A to D, the content server 4 transmits the first part A via the stream distribution. The parts B to D subsequent to the first part A are sequentially transmitted via the buffering distribution. Further, when transmitting the first part A, the content server transmits the subsequent part B concurrently (FIG. 5 (A)).

Thus, it is so designed in this embodiment that while receiving and decoding the first part A, the receiver's side receives and buffers the subsequent part B so that the subsequent part B can be reproduced upon completion of reproducing the part A. Further, it is so designed that while reproducing the part B in this way, the subsequent part C is received and buffered so that the subsequent part C can be reproduced upon completion of reproducing the part B. By enabling the receiver's side to perform these processes, the content server 4 is designed such that a reproducer's side can reproduce the successive parts A to D without interruption and thereby reduce the latency remarkably after a request is made.

In order to do so, the client 2 requests the content server 4 to distribute stream content based on a menu offered by access to the service server 3. Then the client 2 concurrently receives the first and second parts A and B transmitted in this way, decodes the first part A to provide a user with the decoded part A, and buffers the second part B. Further, upon completion of decoding the first part A, the client 2 starts decoding the second part B and also receives and buffers the subsequently transmitted third part C. Further, upon completion of decoding the second part B, the client 2 starts decoding the third part and also starts receiving and buffering the fourth part, and upon completion of decoding the third part C, starts decoding the fourth part D.

(2) Operation of the Embodiment

In the above configuration, this distribution system 1 operates such that the client 2 is provided with a list or the like of content for distribution by access to the service server 3, and stream content is provided from the content server 4 by access following this list.

In this way of providing the content, among four parts A to D formed by dividing single stream content in a time-series manner, the content server 4 provides the first part A and subsequent part B via the stream distribution and the buffering distribution, respectively, and the subsequent parts C and D via the buffering distribution. Further, the parts B to D other than the first part are distributed such that upon the end of decoding an immediately preceding part, a receiver's side can decode a succeeding part for reproduction.

Thus, the receiver's side can stream-receive the first part A, whereby the stream content can be provided to the user with an extremely low latency period. Further, while providing the user with the first part A in this way, the receiver's side buffer-receives the subsequent part B, i.e., receives and buffers the part B, and starts decoding the part B upon completion of decoding the part A, whereby the successive parts A and B can be provided to the user without interruption.

Further, while providing the user with the part B in this way, the receiver's side receives and buffers the subsequent part C, and upon completion of decoding the part B, it starts decoding the part C. Further, while providing the user with the part C, the receiver's side receives and buffers the subsequent part D, and upon the end of decoding the part C, it starts decoding the part D. Thus, this embodiment ensures a low latency and allows the successive parts A to D to be provided to the user without interruption. At this time, the parts B to D other than the first part are provided via the buffering distribution, whereby recovery processing for a transmission error can be performed whenever necessary, thus ensuring a high reliability.

(3) Advantages of the Embodiment

According to the above configuration, single stream content is divided into a plurality of parts in a time-series manner, a first part is transmitted via the stream distribution, and remaining parts are transmitted via the buffering distribution such that decoding of a receiver's side can be started upon the end of decoding an immediately preceding part, and whereby the stream content is distributed with a high reliability and latency can be reduced remarkably as compared to that in the conventional art.

(4) Second Embodiment

In this embodiment, the first part A according to the above-described first embodiment is distributed via unicast and the remaining parts B to D are distributed via multicast.

Here, unicast means the process of distributing one item of stream content to one client exclusively, whereas multicast means the process of distributing one item of stream content to a plurality of clients in common. In a distribution via the multicast, the content server 4 transmits the plurality of parts C and D sequentially and cyclically, and each client buffer-receives these parts C and D sequentially and selectively.

Thus, it is so designed in this embodiment that the stream distribution of the first part is performed via unicast to allow the latency to be reduced accordingly.

Further, it is so designed that the buffering distribution of the remaining parts is performed via multicast to prevent a bandwidth required for transmission from increasing.

Further, the multiple parts are each transmitted sequentially and cyclically to implement a distribution via the multicast, whereby it is designed to prevent the bandwidth required for transmission from increasing even if the number of clients is increased.

(5) Other Embodiments

Note that while the cases where single stream content is distributed by division into four parts have been described in the above-described embodiments, the present invention is not limited thereto. By dividing single stream content into such various parts as necessary, advantages similar to those of the above-described embodiments can be obtained.

Further, while the cases where parts to be buffer-distributed are sequentially received and buffered have been described in the above-described embodiments, the present invention is not limited thereto. What matters is that it is arranged so that upon the end of decoding an immediately preceding part, buffering is completed so that decoding can be started. As long as it is so arranged, even when a first part and subsequent second and third parts may be received concurrently, advantages similar to those of the above-described embodiments can be obtained.

As described above, according to the present invention, single stream content is divided into a plurality of parts in a time-series manner, and a first part is transmitted via the stream distribution, and remaining parts are transmitted via the buffering distribution such that decoding of a receiver's side can be started upon completion of decoding an immediately preceding part, whereby the stream content is distributed with a high reliability and latency can be reduced remarkably as compared to that in the conventional art.

INDUSTRIAL APPLICABILITY

The present invention relates to a content providing apparatus and a content providing method and can be applied, for example, to distribution of music and videos via the Internet.

The invention claimed is:

1. A content providing apparatus for transmitting stream content to a client, the apparatus comprising:
   a content server adapted to divide single stream content into parts, said content server being adapted to transmit a first of said parts and remaining ones of said parts,
   wherein said single stream content is divided into said parts in a time-series direction,
   wherein said content server transmits said first of said parts via stream distribution,
   wherein said content server transmits said remaining ones of said parts via buffering distribution,
   wherein said content server transmits a first segment of said remaining ones of said parts and said first of said parts concurrently,
   wherein said content server transmits a next segment of said remaining ones of said parts after transmission of said first segment; and
   wherein a client receives and reproduces said first of said parts while buffering said first segment.

2. The content providing apparatus for transmitting as in claim 1, wherein said stream distribution is a distribution via unicast.

3. The content providing apparatus for transmitting as in claim 1, wherein said buffering distribution is a distribution via multicast.

4. A content providing method of transmitting stream content to a client, the method comprising:
   dividing single stream content into parts, wherein said single stream content is divided into said parts in a time-series direction;
   transmitting a first of said parts and remaining ones of said parts, said first of said parts and a first segment of said remaining ones of said parts being transmitted concurrently, wherein said content server transmits said first of said parts via stream distribution, and wherein said content server transmits said remaining ones of said parts via buffering distribution; and
   thereafter, transmitting a next segment of said remaining ones of said parts, wherein a client receives and reproduces said first one of said parts while buffering said first segment.

5. A content providing apparatus for receiving single stream content, the single stream content being divided into parts, the apparatus comprising:
   a client adapted to receive a first of the parts and remaining ones of said parts, said first of said parts and a first segment of said remaining ones of said parts being received concurrently,
   wherein said client receives and reproduces said first of said parts while buffering said first segment,
   wherein said content server divides said single stream content into said parts in a time-series direction,
   wherein said content server transmits said first of said parts via stream distribution,
   wherein said content server transmits said remaining ones of said parts via buffering distribution, and wherein said first of said parts and said first segment of said parts are transmitted concurrently.

6. The content providing apparatus for receiving as in claim 5, wherein said first segment is reproduced after reproducing said first of said parts.

7. The content providing apparatus for receiving as in claim 6, wherein a content server transmits a next segment of said remaining ones after transmission of said first segment, said client receiving and buffering said next segment while reproducing said first segment.

8. The content providing apparatus for receiving as in claim 7, wherein said client reproduces said next segment after reproducing said first segment.

9. A content providing method of receiving single stream content, the single stream content being divided into parts, the method comprising:
   receiving a first of the parts and remaining ones of said parts, said first of said parts and a first segment of said remaining ones of said parts being received concurrently;
   reproducing said first of said parts while buffering said first segment;
   wherein said content server divides said single stream content into said parts in a time-series direction;
   wherein said content server transmits said first of said parts via stream distribution;
   wherein said content server transmits said remaining ones of said parts via buffering distribution; and
   wherein said first of said parts and said first segment of said parts are transmitted concurrently.

10. The content providing method of receiving as in claim 9, further comprising:
    reproducing said first segment after the step of reproducing said first of said parts.

11. The content providing method of receiving as in claim 10, further comprising:
    receiving and buffering a next segment of said remaining ones during the step of reproducing said first segment.

12. The content providing method of receiving as in claim 11, further comprising:
    reproducing said next segment after the step of reproducing said first segment.

* * * * *